UNITED STATES PATENT OFFICE.

ISRAEL ROOS, OF FRANKFORT-ON-THE-MAIN, GERMANY.

PROCESS OF PURIFYING SUINT.

SPECIFICATION forming part of Letters Patent No. 451,642, dated May 5, 1891.

Application filed December 16, 1890. Serial No. 374,932. (No specimens.) Patented in Belgium August 18, 1890, No. 91,668, and in Luxemburg November 18, 1890, No. 1,373.

*To all whom it may concern:*

Be it known that I, ISRAEL ROOS, chemist, a subject of the King of Prussia and German Emperor, residing at Frankfort-on-the-Main, in the Kingdom of Prussia and German Empire, have invented certain new and useful Improvements in the Manufacture of Saponifiable Fatty Matter from Wool-Fat, (for which I have obtained patents in Belgium, No. 91,668, dated August 18, 1890, and in Luxemberg, No. 1,373, dated November 18, 1890;) and I do hereby declare the following to be a full, clear, and exact description of the invention, such as will enable others skilled in the art to which it appertains to make and use the same.

According to this invention a yellowish-white fatty matter is produced from commercial wool-fat which is of a dark-brown color, and which in this condition is either not at all applicable to the manufacture of soap or can only be used for the most inferior sorts. The said improved product, on the other hand, can be used either alone or mixed with other suitable saponifiable fats for the production of light-colored kinds of soap. The process for the production of such material is based on the discovery that if by means of a soda solution or other substance producing the saponification of the wool-fat only a partial saponification thereof be effected, and the resulting emulsion be mixed with water and allowed to stand, the non-saponifiable cholesterines, &c., will collect at the top of the deposited saponified fatty acids, which are partly in solution and partly in emulsion, so that by this means a separation and precipitation of the soap from the non-saponifiable constituents can be effected. By adding to the separated soap a quantity of diluted acid the pure saponifiable fatty products may be gained.

In practically carrying out this process one hundred parts, by weight, of wool-fat is stirred together with one hundred parts of boiling water until the wool-fat is melted. Ten parts of crystallized carbonate of soda dissolved in twenty parts of water are then added, and the whole is stirred together for some time at a temperature above the melting-point of the wool-fat. The liquid is then boiled and is added to four hundred parts of water under continued stirring. If the liquid be then allowed to stand and cool, the above-mentioned separation will take place, a layer of the non-saponifiable cholesterines, &c., collecting at top, while below the same the soap, partly dissolved and partly in emulsion, will be deposited. These solutions of soap are drawn off, and to them are added dilute acids, whereupon a resulting fatty product will be separated, and will only require to be well washed one or more times. If necessary, this fatty product can be subjected repeatedly to the above process for effecting its further purification. This fatty product, having a yellowish white to perfectly white color, can then be used either alone or mixed with other fats and oils for the preparation of soaps and other saponaceous products.

What I claim is—

The process of treating commercial wool-fat, which consists in first mixing the wool-fat with hot water, then adding an alkaline solution, then boiling the mixture, then permitting the mixture to stand and cool to separate the non-saponifiable ingredients, then treating the saponaceous solution with a dilute acid, and finally washing the fatty product to remove the excess of acid, substantially as and for the purpose set forth.

In testimony whereof I affix my signature in presence of two witnesses.

ISRAEL ROOS.

Witnesses:
ALVESTO S. HOGUE,
JEAN GRUND.